Figure 1:
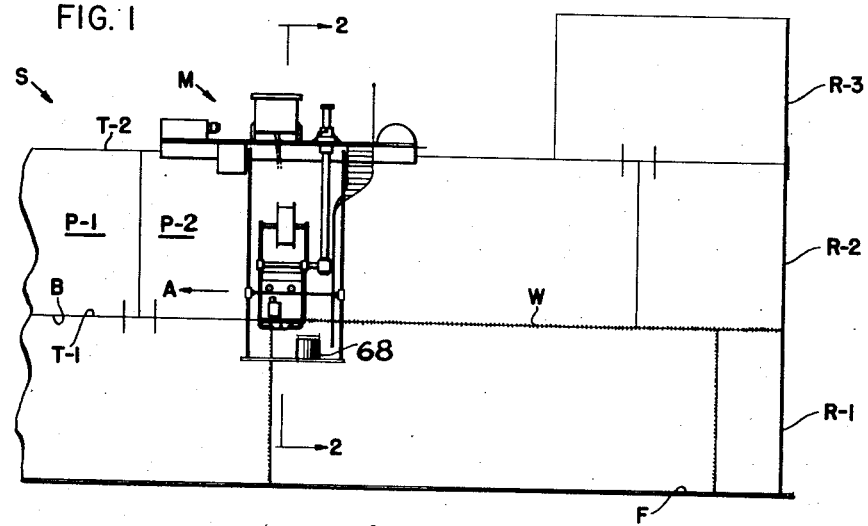
Figure 2:
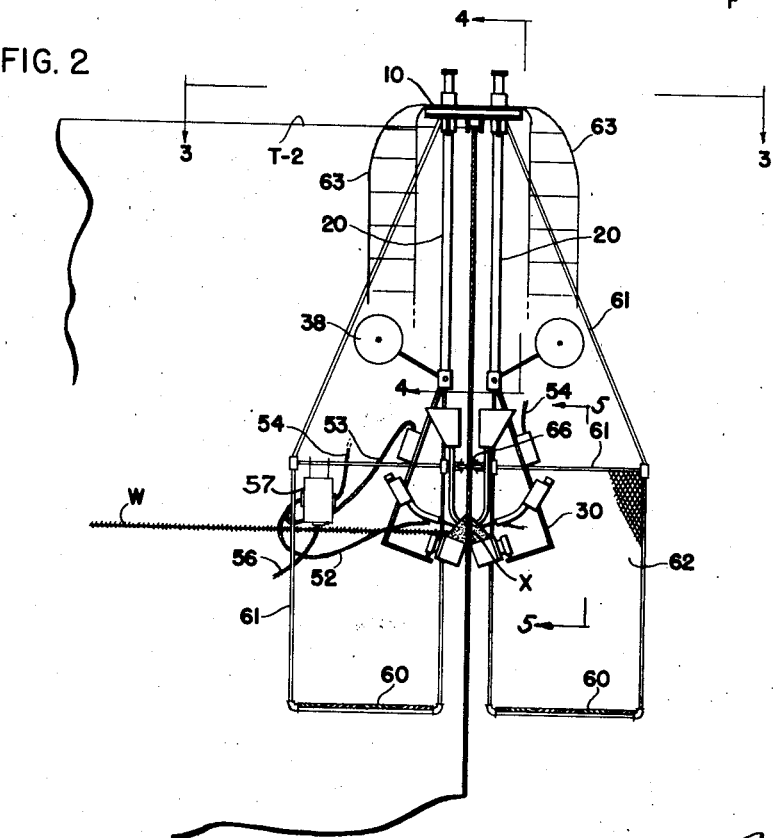

Sept. 17, 1957 A. R. MEYER 2,806,935
WELDING TOOL MANIPULATING APPARATUS
Filed Oct. 24, 1951 3 Sheets-Sheet 1

INVENTOR:
Amel R. Meyer
BY
F. D. Prager
Atty:

Sept. 17, 1957 A. R. MEYER 2,806,935
WELDING TOOL MANIPULATING APPARATUS
Filed Oct. 24, 1951 3 Sheets-Sheet 2

INVENTOR:
Amel R. Meyer
BY
F. D. Draper
Atty:

Sept. 17, 1957          A. R. MEYER          2,806,935
WELDING TOOL MANIPULATING APPARATUS
Filed Oct. 24, 1951          3 Sheets-Sheet 3
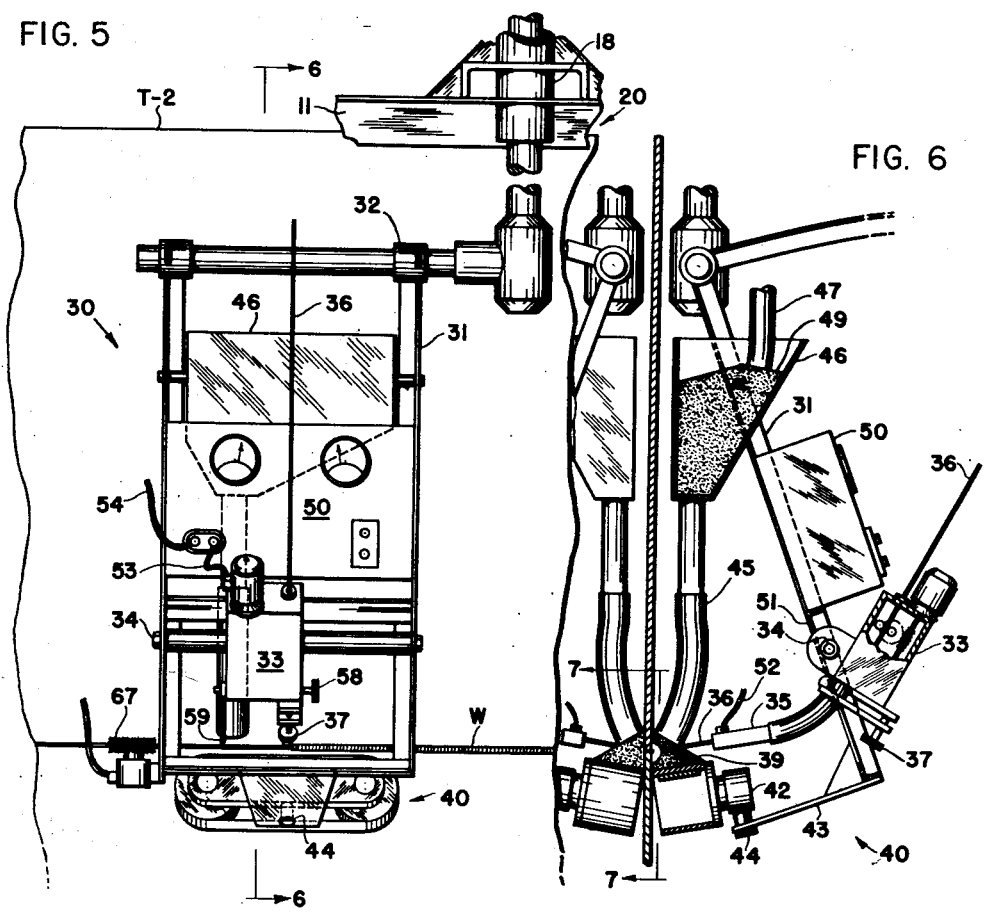
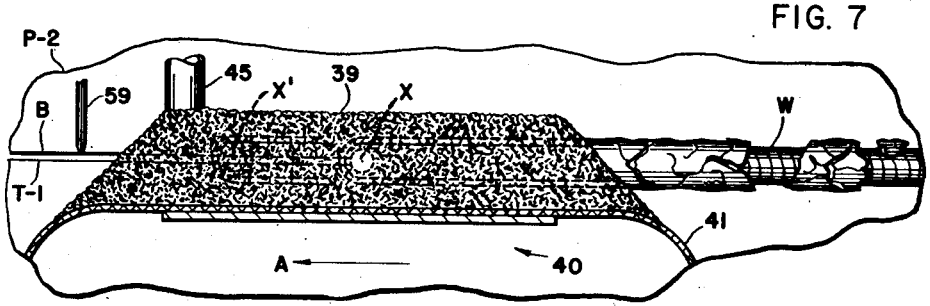
INVENTOR:
Arnel R. Meyer
BY
F. D. Rapp
Atty.

United States Patent Office 2,806,935
Patented Sept. 17, 1957

2,806,935

WELDING TOOL MANIPULATING APPARATUS

Amel R. Meyer, Griffith, Ind., assignor, by mesne assignments, to Chicago Bridge & Iron Company, a corporation of Illinois Application October 24, 1951, Serial No. 252,918

7 Claims. (Cl. 219—126)

This invention relates to manipulating apparatus for welding tools, particularly for field construction work on vertical tank shells. In this kind of work the horizontal seams constitute a major item of expense. The invention provides a means to reduce this expense and to expedite the work while doing work of the highest quality.

In shop fabrication, welding tool manipulators are generally used, together with the highly desirable continuous welding electrodes and automatic welding processes. In field construction on the other hand, automatic welding with continuous electrodes has not been used and manipulators have been unsuccessful up to now.

Work piece manipulators are obviously not to be used with stationary tank shells, but even tool manipulators have found difficulties in field work. One reason was that the vertical plates of the shells to be welded normally are curved, either cylindrically or otherwise. This introduces difficulties, for instance in supporting the granular flux required for continuous welding electrodes.

Another reason for said difficulties was that the shell plates often have deformations due to unavoidable incidents of fabrication, shipment, or field procedure. Such deformations are usually unobjectionable from the standpoint of workmanship and quality in the completed tank shell. No useful purpose would generally be served by trying to keep shell plates in mathematically perfect shape.

From the standpoint of welding tool manipulation the normal curvatures and occasional irregularities of the stationary shell plates were vital, up to now. They made it either impossible or too expensive to maintain the required accurate correlation between the plate surfaces or edges and the electrode tips.

The new manipulator maintains this correlation, allowing successful automatic field welding in "horizontal position," that is, on horizontal edges of vertical plates. It allows such work from one or both sides of the plates, fully or substantially simultaneously. It has been used successfully in automatic field work, wherein long horizontal weld seams were deposited. The overall expense involved in its use has been found to be minor, as comparted either with the welding manipulators used elsewhere or with other procedures for the welding of tank shells in question.

The general nature of the invention will be clear from the foregoing remarks. Details will appear from the description of a preferred embodiment, which follows.

In the drawing Fig. 1 is an elevation of a preferred embodiment of this invention, shown in operative position upon a tank shell under construction. Figs. 2 to 7 are enlarged sectional views taken along corresponding lines.

Shell S is shown as being constructed with the help of the new mechanism M. Horizontal steel floor plates F have been placed and a first ring R-1 of vertical, rectangular steel plates has been erected, the short sides being butt welded together and the long sides fillet welded to the floor plates, as usual. A second ring R-2 is now under construction. The rectangular steel plates P-1, P-2 etc. forming this second ring have been hoisted up and positioned by well-known construction equipment (not shown). They are temporarily secured to the first ring, in substantially vertical planes and with their edges in substantially horizontal position; the bottom edge B of the second ring being butted against the top edge T-1 of the first ring. The mechanism M is positioned upon the horizontal top edge T-2 of the second ring, to guide the welding tools along the horizontal bottom edges T-1, B. In the position as shown the mechanism has already joined a weld seam W along part of the length of the edges B, T-1; and part of a third ring R-3 has already been placed in position for temporary fastening, while the work on the seam B, T-1 continues in the direction of the arrow A.

The entire mechanism is light enough to be supported by the vertical ring plates R-2; it uses no other support. The centers of gravity of the entire mechanism and of certain parts thereof are so disposed as to facilitate accurate welding, as will now be explained.

The upper part of the new mechanism M is shown as a carriage 10, travelling on the top edge T-2. This carriage has a rigid, low, horizontally elongated frame 11 and at least one drive wheel 12. It is shown as having one additional wheel 13, which is an idler. A drive and bearing unit 14 is provided for the drive wheel and a bearing unit 15 for the idling wheel. Each unit 14, 15 is connected with the frame 11 by bolts 16 in elongated slots 17, so that the wheels can be adjusted for smooth operation on plates P-1, P-2, etc. having different radii of curvature.

In the construction as shown, each side of the carriage frame 11 has a vertical guide sleeve 18 rigidly incorporated in said frame and reenforced by vertical ribs 19. Each guide sleeve holds a strong arm 20, which reaches vertically down toward the lower edges B, T-1. In this manner a rigid carriage structure or chassis is formed by the members 11, 18 and 20. The structure straddles the shell plates; the two arms being located at the two sides of the carriage-supporting plate P-2. In order to allow work on plate rings R-2 etc. of different height, the arms 20 are vertically adjustable in their sleeves 18. For this purpose each arm may be formed by a pipe or rod with a rack 21 secured to its outside and each rack meshed with a pinion 22, pivoted to one of the sleeves 18 and actuated by a suitable drive unit 23. While being raised or lowered the pipe arm 20 has sliding fit in the sleeve 18. When it has been raised or lowered to the proper level it is desirably secured in position, for instance by a set screw 24 which may be threaded into the sleeve 18 and engage a wearing strip 25 on the surface of the pipe arm.

Another sleeve 26 is rigidly secured to the lower end of each pipe arm 20. It has a bearing member 27 rigidly secured thereto, preferably in form of a horizontal rod or axle 28, inserted in a side fitting 29 of the sleeve 26. Each bearing or axle 28 extends in a direction tangential to the circle formed by the plates P-1, P-2 on which the wheels 12, 13 run; that is in the direction A of the travel of such bearing. A tool support frame 30 is swingably suspended from each bearing 28. By means of the plate-straddling pair of arms 20, and parts suspended therefrom, the carriage is substantially balanced on the top edge T-2; the chassis 11, 18, 20 has a center of gravity substantially below that edge. Again each frame 30 has a center of gravity below its bearing 28 and such center is raised at least a slight distance above its lowermost position when the apparatus is in operation. In other words, the main chassis is substantially balanced and the tool frames are slightly unbalanced statically.

The two frames 30 may be identically constructed and identically equipped. Only one of them will therefore be described. In the form as shown it comprises two structural side members 31, parallel with one another and normally suspended from the horizontal bearing or axle 28 by means of collars 32 at their upper ends. An automatic welding head 33 is mounted on the bottom end of the frame, for instance by means of bolts 34. These bolts allow vertical adjustment of the electrode nozzle 35 forming a lower part of the welding head, the free end of which nozzle must be located opposite the pair of edges B, T-1 to be welded. A finer vertical adjustment of the tip of the electrode wire 36 can be achieved by an adjustment screw 37 incorporated in the welding head. The electrode wire is unrolled in the usual manner from a reel 38 held on the tool support frame above the welding head.

The tip of the electrode wire is preferably submerged in a layer 39 of granular or powdered flux. Such a layer can be provided by an applicator device 40 mounted on and swingable with the tool support frame. This applicator comprises a horizontally limber, vertically restrained flux belt or flux support member 41, somewhat elongated along the edges B, T-1 and held in close contact with the lower shell plate. The flux support member is supported by a bar 42, pivoted to a bottom plate 43 of the chassis 30 to allow angular adjustment or self-adjustment of the flux support member 41. A pivot 44 is provided for the members 42 and 43, substantially in the middle of their length. The pivot has an approximately vertical centerline, preferably slightly inclined in an upward direction toward the tank shell. The two ends of the elongated flux support member 41 contact the shell. They do so with some mechanical pressure, since the chassis 30 suspended at 32, leans against the shell, with the flux applicator 40 acting as a contact medium and absorbing the pressure reaction. This mechanical pressure reaction is equalized between the two ends of the applicator by means of the pivotal connection 44.

Powdered or granular flux, to submerge the tip of the electrode, is placed on the applicator 40 by the spout 45 of a hopper 46 mounted on the tool frame 30. The hopper is supplied with flux through a hose 47 suspended from a bin 48 on the carriage 10. It is usually possible to actuate the supply of flux simply by gravity; that is, the spout 45 discharges onto the applicator until and only until its discharge end is very slightly immersed in the flux layer 39; and likewise the hose 47 discharges into the hopper until and only until its discharge end is very slightly immersed in a mass 49 of flux within the hopper.

It will be seen that a stop device 40, mounted on the frame 30 remotely of the bearing 28, controls the distance between the electrode tip and the shell. Such a stop device is provided, according to this invention, even if the arc is not submerged in a layer of flux.

For the basic control of the welding operations a control box 50 is provided on each side of the chassis 11, 18, 20. The box may rest for instance on a shelf 51 forming part of the respective tool frame 30. This box may contain conventional instruments (not shown) to control automatically the density of the welding current and the feed rate of the electrode wire, through conductors 52 and 53 respectively.

The two welding heads, on the inner and outer frames 30, are preferably interlocked electrically with one another and with the carriage drive unit 14, by conductors 54 leading to conventional relay instruments (not shown) contained in a relay box 55 which is mounted on the carriage, so that under proper conditions the carriage can be started and stopped from either side and that the starting and stopping of the carriage will start and stop the welding operation on either side, or vice versa. The operations can further be correlated to allow the deposition of equal or different sizes or types of weld seams on the two sides, and other procedural refinements, forming no part of the present invention. Welding and power current from suitable generators (not shown) is supplied to both units by conductors 56, leading from the interior of the shell S through a connector box 57 to the relay box 55.

In this manner suitable submerged arcs X, X-1 can be established, maintained and traversed along the two sides of the plate edges B, T-1; thereby forming continuous, homogeneous, horizontal weld seams W on both sides of the shell. The longitudinal distance between the arcs X, X-1, along the edges B, T-1, can be adjusted by adjustment screws 58. The arc struck on one side is usually visible from the other side, so long as no flux layer has been deposited on the other side. The position of each arc can also be shown by indicators 59.

For the various adjustments and other supervisory operations, an operator's platform 60 is suspended from the carriage 10 on each side of the shell by an auxiliary chassis 61. Protection against wind may be provided by curtains 62 around the auxiliary chassis. Access from one platform to the other is insured by ladders 63 with hand rails 64, forming part of the auxiliary chassis 61 and interconnected by a walkway 65 across the carriage. The operator's platforms preferably lean against the tank shell, roller casters 66 being used to hold them in position and to stabilize the carriage.

The main or auxiliary chassis may also support auxiliary devices; for instance wire brushes or other means 67 to prepare the seam B, T-1 for welding; or means 68 for the disposal of slag and excess flux discharged from applicator 40.

In order to suit different operators, and to compensate for vertical adjustments of the arm 20 and main tool frames 30, the auxiliary chassis 61 may be vertically adjusted at 69. The roller casters 66 may be adjustable as at 70, in order to facilitate bringing the shell-straddling carriage structure into operative position.

When the structure M is hoisted, with the aid of a crane or other construction unit, it may be desirable to remove the instrument boxes and flux applicators or the entire swingable frames 30, or even part of a complete chassis from said structure. Removal of a frame 30 may also be desirable in other cases; for instance, if a welding head is provided only on one such frame, which is first used on one side and then on the other side of the shell. In this case it may be desirable, when depositing the first seam, to hold a backup member or the like against the other side, by the other frame. However, the mechanism M can also be operated with a single frame 30 successively connected with the two bearing members 28.

The vertical loads on the two sides of the chassis 11, 18, 20 may be unbalanced for instance due to the leaving off of one frame 30, or by different loads on the operating platforms, or different electrode reels on the two sides. It is one of the advantages of the combination of rigid and yieldable structures as described that proper spacing is still maintained between the shell and the two sets of electrode and flux applying devices. A further, closely related advantage is that such proper spacing is maintained regardless of typical irregularities of the tank shell.

Figure 3:
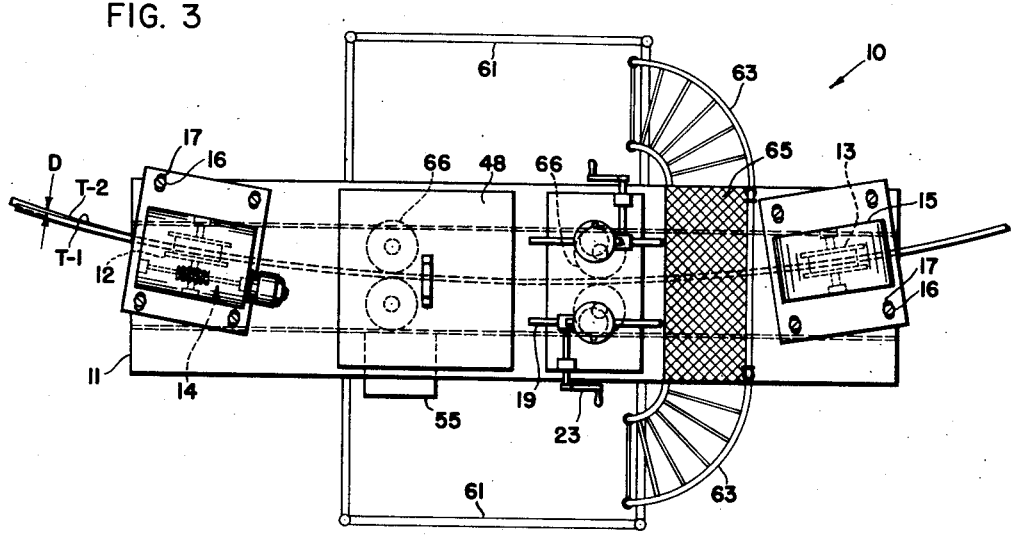
Figure 4:
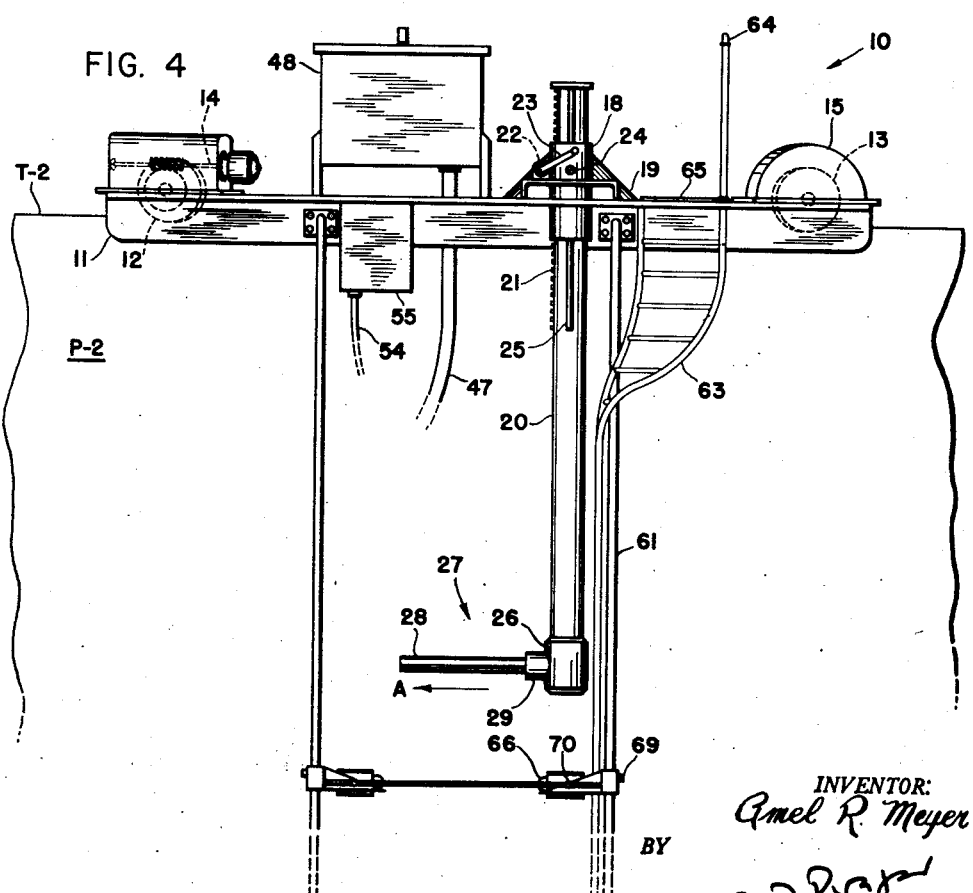

As diagrammatically indicated in Fig. 3, there may be a divergence D between upper and lower plate edges T-2, T-1. Such a divergence may be caused by buckled plates, or by welding shrinkage, or otherwise. The mutually opposed, only approximately equal pressure reactions carried by casters 66 may either reduce or aggravate the irregularity. As indicated before, such irregularities are generally minor in comparison with the general tank and plate dimensions, so long as the completed shell must have a proper appearance and workmanship. For this reason, the swinging movements of the frames 30, bearing against the shell, have minute angularities and minute vertical components. The horizontal amplitude of such swinging movements is considerable only in relation to the dimensions of welding arc zones X or X-1.

To some extent plate irregularities can also be compensated otherwise, for instance by electronic arc control instruments (not shown) sensing the variable distance between the tip of the electrode and the shell surface, and responding with suitable automatic adjustments of the electrode feed rate or welding current characteristics or both. However, mechanical compensation by the swinging frame is not only simpler, cheaper atnd more reliable; it is also preferable for the further reason that the capacity for adjustments as mentioned, provided by each welding head and control set, is needed for other, inherent variations, such as irregularities of electrical or thermal characteristics either in the electrode or in the shell.

While the advantages of the swinging or generally yieldable tool support frame have been emphasized, it is equally important to note the importance of rigidity in the transporting chassis 10, 18, 20 and connected parts, down to the bearings 28. This rigidity maintains an accurate positioning of the two electrodes relative to the elevation of the seam. It also maintains the longitudinal spacing—if any—of the electrodes on the two sides.

A number of modifications no doubt will occur to persons skilled in the art.

I claim:

1. Welding tool manipulating apparatus for submerged arc welding of substantially horizontal edges of substantially vertical, stationary shell plates, comprising a rigid chassis adapted to travel upon an upper edge of such a plate in a direction parallel with the edge; a frame supported by the chassis laterally of the plate, at least a portion of the frame adjacent a lower edge of the plate being adapted to move in a vertical plane transverse of said direction and being biased toward the plate; flux support means supported by said portion of the frame, adapted to move transversely of said direction, in a flat plane, to contact the plate and thereby to control transverse movements of the frame and flux support means; and means to feed flux and welding wire to the plate, directly above the flux support means.

2. Welding tool manipulating apparatus for use along a stationary, generally vertical but at least slightly irregular shell, comprising a carriage adapted to travel in a direction generally parallel with a surface of said shell; a pivot on said carriage with a substantially horizontal axis generally parallel with a tangent on said surface; and a chassis swingably suspended from the pivot, comprising welding tool means with a working surface opposite the shell, and having a center of gravity spaced below the pivot, said center of gravity being raised above its lowermost position when asid working surface contacts the shell.

3. Welding tool manipulating apparatus for use along a stationary, generally vertical but at least slightly irregular shell with a substantially horizontal top edge and substantially horizontal seams, comprising a carriage adapted to travel upon and along the top edge; at least one pivot on said carriage with a substantially horizontal axis generally parallel with a tangent on said top edge; and a chassis swingably suspended from the pivot, comprising welding tool means with a working surface opposite a seam, and having a center of gravity, spaced below the pivot, said center of gravity being raised above its lowermost position when said working surface contacts the shell.

4. Flux support manipulating apparatus for the submerged-arc welding of seams in a stationary, generally vertical but at least slightly irregular shell, comprising a carriage adapted to travel in a direction generally parallel with a surface of said shell; a pivot on said carriage with a substantially horizontal axis generally parallel with a tangent on said surface; a chassis swingably suspended from said pivot; and a substantially flat flux support strip supported by said chassis adjacent the lower end of the chassis, with a working edge opposite a seam; the center of gravity of the chassis and means supported thereby being spaced below the pivot, and being raised above its lowermost position when said working surface contacts the shell.

5. Welding tool manipulating apparatus for work on substantially horizontal edges of substantially vertical stationary shell plates, comprising a rigid chassis adapted to travel upon an upper edge of such plates in a direction parallel to said edges; a pair of vertically suspended frames opposite one another on the opposite sides of said plates, vertically swingable and having a substantially horizontally swingable centrally pivoted end portion bearing against said plates.

6. Welding tool manipulating apparatus for work on substantially horizontal edges of substantially vertical stationary shell plates, comprising a rigid chassis adapted to travel upon an upper edge of such a plate in a direction parallel with the edge and to straddle the plate; a pair of frames yieldably supported from the chassis, one on each side of the plate, each frame having a work edge portion adjacent a lower edge of the plate and being adapted to support a welding tool for work on the lower edge; the work edge portion of each frame being adapted to move toward the plate to contact the plate, and thereby to control the movement toward the plate; a pair of arms rigidly secured to an upper part of the chassis, extending downward therefrom, close to the plate, one on each side of the plate; and a bearing member rigidly secured to each arm and axially oriented parallel with said direction; said pair of arms and bearing members forming parts of the plate-straddling chassis, and each frame being supported by one of the bearing members.

7. Welding tool manipulating apparatus as defined in claim 6 wherein the arms are vertically adjustable.

References Cited in the file of this patent

UNITED STATES PATENTS

| | | |
|---|---|---|
| 857,292 | Machlet | June 18, 1907 |
| 2,071,246 | Allen | Feb. 16, 1937 |
| 2,529,812 | Peters | Nov. 14, 1950 |
| 2,713,106 | Arnold | July 12, 1955 |